United States Patent [19]

Ikoma et al.

[11] Patent Number: 5,466,543

[45] Date of Patent: Nov. 14, 1995

[54] NICKEL POSITIVE ELECTRODE FOR USE IN ALKALINE STORAGE BATTERY AND NICKEL-HYDROGEN STORAGE BATTERY USING THE SAME

[75] Inventors: Munehisa Ikoma, Nara; Kimie Muramatsu, Kyoto; Hiromu Matsuda, Hyogo; Norikatsu Akutsu, Tokyo; Isao Matsumoto, Osaka, all of Japan

[73] Assignee: Matsushita Electric Industrial Co., Ltd., Osaka, Japan

[21] Appl. No.: 208,080

[22] Filed: Mar. 9, 1994

Related U.S. Application Data

[63] Continuation of Ser. No. 8,798, Jan. 25, 1993, abandoned.

[30] Foreign Application Priority Data

Sep. 18, 1992 [JP] Japan ................................. 4-248973

[51] Int. Cl.⁶ ..................................................... H01M 4/32
[52] U.S. Cl. .......................... 429/59; 429/206; 429/223; 429/229; 252/182.1
[58] Field of Search .................................... 429/206, 223, 429/218, 241, 242, 235, 101; 420/900; 252/182.1

[56] References Cited

U.S. PATENT DOCUMENTS

| | | |
|---|---|---|
| 3,826,684 | 7/1974 | Pensabene . |
| 4,935,318 | 6/1990 | Ikoma et al. ........................... 429/206 |
| 5,032,475 | 7/1991 | Hasebe et al. ...................... 429/223 X |
| 5,045,416 | 9/1991 | Plichta et al. ....................... 429/223 X |
| 5,106,707 | 4/1992 | Catotti et al. ....................... 429/223 X |
| 5,200,282 | 4/1993 | Ohnishi et al. ........................ 429/223 |

FOREIGN PATENT DOCUMENTS

| | | |
|---|---|---|
| 0170573A | 2/1986 | European Pat. Off. . |
| 0477461A | 4/1992 | European Pat. Off. . |
| 61-104565 | 5/1986 | Japan . |

OTHER PUBLICATIONS

Patent Abstract of Japan, vol. 012, No. 261 (E–636) 22 Jul. 1988 & JP–A–63–045 754 (Yuasa Battery Co. Ltd) 26 Feb. 1988.

*Primary Examiner*—Anthony Skapars
*Attorney, Agent, or Firm*—Stevens, Davis, Miller & Mosher

[57] ABSTRACT

A nickel positive electrode for use in alkaline storage batteries which is improved in the rate of utilization of the nickel hydroxide in a wide temperature range with an oxygen evolving overvoltage being increased by incorporating at least one selected from the group consisting of compounds of yttrium, indium, antimony, barium and beryllium, and at least one selected from the group consisting of compounds of cobalt and calcium into the nickel positive electrode (2), and a nickel-hydrogen storage battery using the same.

24 Claims, 2 Drawing Sheets

1

NICKEL POSITIVE ELECTRODE FOR USE IN ALKALINE STORAGE BATTERY AND NICKEL-HYDROGEN STORAGE BATTERY USING THE SAME

This application is a continuation of application Ser. No. 08/008,798, filed Jan. 25, 1993, abandoned.

BACKGROUND OF THE INVENTION

1. Field of the Invention

The present invention relates to a nickel positive electrode having improved characteristics for use in alkaline storage batteries using the positive electrodes of nickel oxide and the negative electrodes of a hydrogen storage alloy capable of electrochemically absorbing and desorbing hydrogen, cadmium, or zinc, and to a nickel-hydrogen storage battery having improved characteristics.

2. Description of the Related Art

Recently, there has been an intensive need for high energy density secondary batteries associated with portable appliances which are made much more valuable, compact and lighter in weight. Similarly, such new high energy density secondary cells are also vigorously sought for power supplies for electric automobiles. To cope with these needs, in the technical field of nickel-cadmium cell (referred to as Ni/Cd cell hereunder), there have been developed a Ni/Cd cell having a higher capacity using conventional sintered nickel positive electrodes and further a much higher energy density Ni/Cd cell having a capacity of 30 to 60% greater than that of the former using foamed metal type nickel positive electrodes. Moreover, there has been developed a nickel-hydrogen storage battery with negative electrodes of a hydrogen storage alloy having a higher capacity than those of Ni/Cd cells, i.e., a capacity two times or more as great as those of Ni/Cd cells using sintered nickel positive electrodes. These high capacity alkaline storage batteries include positive electrodes composed of a sintered porous nickel body, a bulk foamed porous nickel body, or a porous fibrous nickel body of a high porosity (90% or more) which are filled with nickel hydroxide powder to a high density in order to achieve an improvement in energy density of the positive electrodes. Consequently, modern sintered nickel positive electrodes have an improved energy density of 450 to 500 mAh/cm$^3$, and foamed metal type nickel positive electrodes have an energy density of 550 to 650 mAh/cm$^3$, as opposed to conventional sintered nickel positive electrodes having an energy density of 400 to 500 mAh/cm$^3$. Those positive electrodes composed of a sintered porous nickel body, a foamed porous nickel body, or a porous fibrous nickel body which are filled with nickel hydroxide powder to a high density have a problem that their energy density can be maintained at higher levels about at normal temperature, but reduced at high temperature atmosphere. Therefore, it is difficult to take advantages of the characteristics of high energy density in a wider temperature range. This is attributed to the fact that a charge reaction accompanied by a conversion from nickel hydroxide to nickel oxyhydroxide and an oxygen evolving reaction are liable to simultaneously occur under a high temperature atmosphere. That is, an oxygen evolving overvoltage at positive electrodes is reduced leading to an insufficient charge reaction of the conversion of nickel hydroxide to nickel oxyhydroxide with a reduced rate of utilization of the nickel hydroxide. In order to overcome this problem, the following methods have been proposed:

(1) a method where cadmium oxide powder or cadmium hydroxide powder is added into positive electrodes, and (2) a method where cadmium oxide is incorporated into the nickel hydroxide powder (Japanese Patent KOKAI (Laid-open) No. 61-104565).

In the conventionally proposed methods (1) and (2) as above, the presence of cadmium oxide inside or with the nickel hydroxide powder improves the rate of utilization of the nickel hydroxide under a high temperature atmosphere. However, even when the addition of cadmium oxide is made, the rate of utilization of the nickel hydroxide under a high temperature atmosphere is only on the order of 80%. In order to improve the rate of utilization of the nickel hydroxide under a high temperature atmosphere, the amount of cadmium oxide to be added into inside the nickel hydroxide or into the nickel positive electrodes must be increased. However, the increase of the amount of cadmium oxide to be added causes a problem of adversely diminishing the rate of utilization of the nickel hydroxide about at normal temperature though the rate of utilization of the nickel hydroxide under a high temperature atmosphere may be improved up to about 90%.

In recent years, attention has been directed to a nickel-hydrogen storage battery containing no cadmium, heavy metal, from the point of environmental hazards. The removal of cadmium oxide from the nickel hydroxide or the positive electrodes, however, produces problems that the rate of utilization of the nickel hydroxide under a high temperature atmosphere is reduced to on the order to 50 to 60% and that when a sealed nickel-hydrogen storage battery with a positive electrode capacity controlled is arranged under less electrolyte conditions, the cycle life is shortened. The present invention is to overcome these problems by providing a nickel positive electrode for use in alkaline storage batteries having an excellent rate of utilization of the nickel hydroxide in an atmosphere in a wide range of temperature. Moreover, an object of the present invention is to provide a nickel-hydrogen storage battery being excellent in the cell capacity and in the cycle life in an atmosphere in a wide range of temperature.

SUMMARY OF THE INVENTION

For overcoming the foregoing problems, the present invention provides a paste type nickel positive electrode (2) comprising a major component of nickel oxide and a bulk porous body, porous plate, or plate supporting the nickel oxide and imparting electroconductivity thereto, where the positive electrode contains at least one of compounds of yttrium, indium, antimony, barium, calcium and beryllium. In another aspect, the present invention provides a paste type nickel positive electrode comprising a major component of nickel oxide and a bulk porous body, porous plate, or plate supporting the nickel oxide and imparting electroconductivity thereto, where the positive electrode contains at least one of cobalt, cobalt hydroxide and cobalt oxide and at least one of calcium compounds incorporated therein. In still another aspect, the present invention provides a nickel-hydrogen storage battery comprising a nickel positive electrode (2) composed of a major component of nickel oxide, a negative electrode (1) consisting of a main body composed of an hydrogen storage alloy capable of electrochemically absorbing and desorbing hydrogen, an alkaline electrolyte, a separator (3), a case (4), and sealing plate (7) equipped with a relief valve (6), where the paste type nickel positive electrode before initially charging comprises nickel hydroxide, at least one of cobalt, cobalt hydroxide and cobalt oxide, at least one of zinc oxide and zinc hydroxide and at least one of calcium compounds, said at least one of zinc oxide and zinc hydroxide being 0.5 to 5 parts by weight, said calcium compounds being 0.5 to 5 parts by weight based on 100 parts by weight of the nickel hydroxide, and a bulk porous body, porous plate, or plate supporting said components in a powdery form and imparting electroconductivity thereto, said alkaline electrolyte having a specific gravity of 1.2 to 1.3 (20° C.), the theoretical negative electrode capacity being not less than 1.1 times the theoretical positive electrode capacity, and the amount of electrolyte being 1.0 to 2.5 cm$^3$/Ah cell capacity.

This constitution, i.e., the inclusion of at least one of compounds of yttrium, indium, antimony, barium and beryllium into the nickel positive electrode (2) allows these compounds to be absorbed on the surfaces of the active material, the nickel oxide resulting in an increase in the overvoltage of evolving oxygen due to a competitive reaction (2) at charging under a high temperature atmosphere. As a result, the charge reaction of the conversion of the nickel hydroxide to nickel oxyhydroxide according to the equation (1) is sufficiently effected with an improvement in the rate of utilization under a high temperature atmosphere.

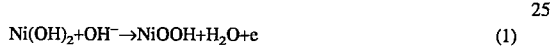

$$Ni(OH)_2 + OH^- \rightarrow NiOOH + H_2O + e \quad (1)$$

$$2OH^- \rightarrow \tfrac{1}{2}O_2 + H_2O + e \quad (2)$$

Moreover, the incorporation of a calcium compound into the paste type nickel positive electrode containing cobalt a synergetic effect of the cobalt and the calcium compound result in an increase in the overvoltage of evolving oxygen due to the competitive reaction at charging under a high temperature atmosphere with an improvement in the rate of utilization under high temperature atmosphere for the nickel positive electrode owing to the same effect as described above. When these compounds are added in an appropriate amount, they do not affect on the rate of utilization of the nickel hydroxide. Therefore, the inclusion of the compounds according to the present invention permits the attainment of a positive electrode being excellent in the rate of utilization of the active material in a wide range of temperature. For practical nickel-hydrogen storage batteries, the charging efficiency according to the above equation (1) may be enhanced by adding cobalt and the calcium compounds to the positive electrode so as to have a specific gravity of 1.2 to 1.3, thereby achieving an excellent discharge capacity in a wide temperature range. Moreover, under the conditions that at least one of calcium compounds and zinc oxide or zinc hydroxide is incorporated in the positive electrode and that the specific gravity and the amount of the alkaline electrolyte range from 1.2 to 1.3 and from 1.0 to 2.5 cm$^3$/Ah, respectively, and that the negative capacity is not less than 1.1 times the positive electrode capacity, localized presence and leakage of the electrolyte inside the cells owing to the repetition of a charge-discharge cycle are inhibited so that the cycle life is improved. These results are recognized to be attributed to the synergetic effect of the conditions of cell design such as the specific gravity and the amount of the electrolyte and the ratio of the negative electrode capacity to the positive electrode capacity and the mixture of at least one of zinc oxide or zinc hydroxide and calcium compounds.

BRIEF DESCRIPTION OF THE DRAWINGS

In FIG. 1, 1 designates a negative electrode, 2 does a positive electrode, 3 does a separator, 4 does a case, 6 is a relief valve, and 7 does a seal plate.

DETAILED DESCRIPTION OF PREFERRED EMBODIMENT

The present invention is illustrated with reference to Examples under.

It should be understood, however, that all modifications which can be made without departing from the spirit and scope of the present invention are intended to be included within the appended claims.

EXAMPLE 1

Nickel positive electrodes containing no cadmium to be used in the present invention were produced in the following procedure: A spherical nickel hydroxide powder, a cobalt powder, a cobalt hydroxide powder and various additives were mixed in a proportion by weight of 100:7:5:X with X being varied to produce compositions as shown in Table 1. To each mixture there was added water to form a paste which was filled into a porous support of foamed nickel having a porosity of 95% and a facial density of 300 g/cm$^2$, dried, pressed, and thereafter, immersed in an aqueous dispersion of fluorinated resin powder. Thereafter, the impregnated support was redried and cut into predetermined dimensions to produce various nickel positive electrodes having a theoretical capacity of 1000 mAh. For Comparative Examples, nickel positive electrodes containing no cadmium and none of the various additives were prepared. The thus produced nickel positive electrodes were designated as shown in Table 1, in which the compositions thereof and the amounts of the additives incorporated therein are also indicated.

TABLE 1

| Designations and compositions of produced nickel positive electrodes, and amounts of additives incorporated therein. | | | | | | |
|---|---|---|---|---|---|---|
| | Amount X | | | | | |
| | 0.2 | 0.5 | 1.0 | 3.0 | 5.0 | 6.0 |
| $Y_2O_3$ | A1 | A2 | A3 | A4 | A5 | A6 |
| $Y(OH)_3$ | | | | B | | |
| $In_2O_3$ | C1 | C2 | C3 | C4 | C5 | C6 |
| $Sb_2O_3$ | | | | D | | |
| $Ba(OH)_2$ | | | | E | | |
| BeO | | | | F | | |
| $Be(OH)_2$ | | | | G | | |

Figure 1:
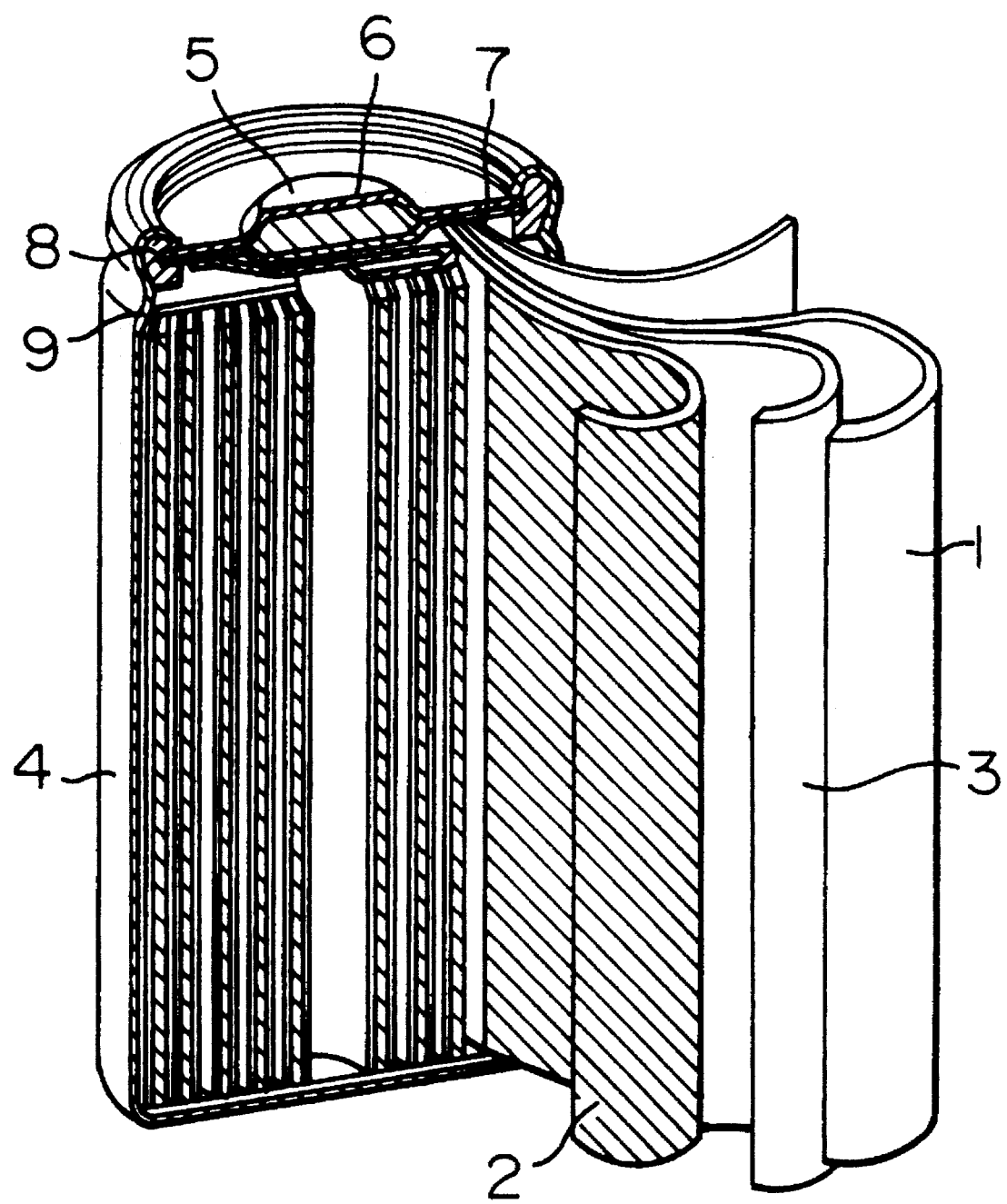
FIG. 1 is a cross-sectional view of the nickel-hydrogen storage battery structured according to the present invention.

Next, the positive electrode 2 produced as above and a hydrogen storage alloy negative electrode 1 (the hydrogen storage alloy had a composition of $MmNi_{3.6}Co_{0.7}Mn_{0.4}Al_{0.3}$) were rolled in a spiral form with a separator being interposed therebetween, and inserted in a case 4 which also acts as a negative terminal. Thereafter, in the resultant assembly, there were injected 2.0 cm$^3$ of an alkaline electrolyte which was a solution of lithium hydroxide dissolved in an aqueous solution of potassium hydroxide having a concentration of 20 g/l and having a specific gravity of 1.3, followed by sealing the case 4 with a seal plate 7 equipped with a relief valve 6 to constitute a sealed nickel-hydrogen storage battery of a AA size having a theoretical capacity of 1000 mAh with the cell capacity being controlled by the positive electrode. The arrangement of the resultant battery is shown in FIG. 1, in which 8 designates an insulating gasket, and 9 designates a positive current collector electrically connecting the positive electrode 2 and the seal plate 7. In this way, various cells were made using positive electrodes A to G and evaluated for the rate of utilization of the positive electrode. The cells were charged at a charge rate of 0.1 C for 15 hours at a temperature of 20°, 30°, 40° and 50° C. in ambient atmosphere, and then left to stand for three hours at 20° C. in ambient atmosphere, and thereafter, discharged at a discharge rate of 0.2 C in ambient atmosphere at 20° C. until reaching 1.0 V. After performing the charge and discharge cycles under the aforementioned conditions, the rate of utilization of the positive active material, nickel hydroxide, was determined by calculation according to the following equation:

Rate of utilization of positive electrode (%)=(Discharge capacity/ 1000 mAh)×100

Figure 2:
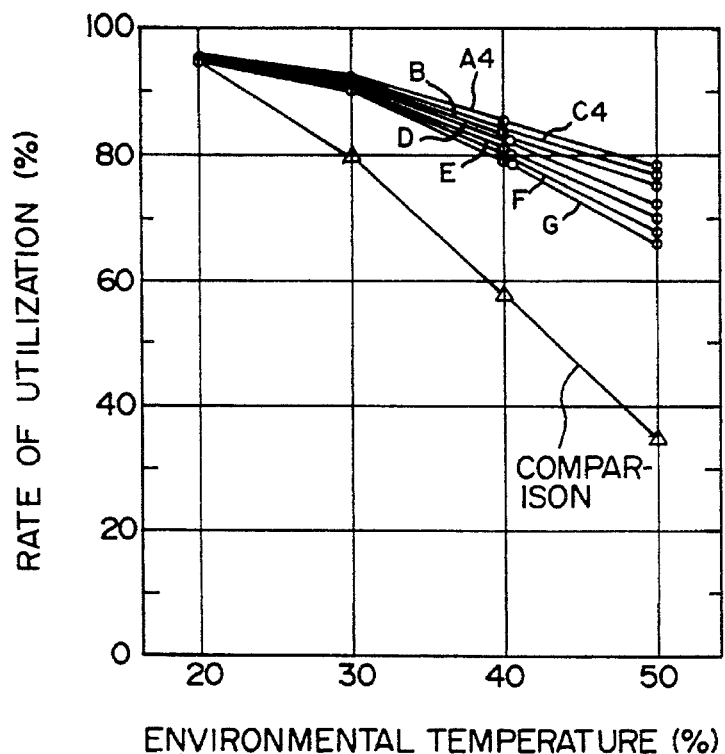
FIG. 2 is a graphical illustration showing the relationship between the environmental temperature when charging the nickel positive electrode produced according to the present invention and the rate of utilization of the nickel hydroxide.

The results of the evaluation for the rate of utilization of the positive active material, nickel hydroxide, using A4, B, C4, D, E, F, G are shown in FIG. 2. Comparative Examples indicated a rate of utilization of 95% in ambient atmosphere at 20° C., but 79% at 30° C. 57% at 40° C., and 35% at 50° C. It can clearly be seen that when the positive electrode containing no cadmium was used in the Comparative Examples, the rate of utilization of the nickel hydroxide was lowered with charging in a higher temperature atmosphere. In contrast, the use of the positive electrodes, A4, B, C4, D, E, F, G according to the present invention achieved a rate of utilization of the nickel hydroxide of 94 to 95%, 90 to 93%, 78 to 85%, and 66 to 78% at 20° C., 30°° C., 40° C., and 50° C., respectively, indicating the attainment of excellent rate of utilization in a wider temperature range. This may be attributed to an increase in oxygen evolving overvoltage owing to absorption or adsorption of $Y_2O_3$, $Y(OH)_3$, $In_2O_3$, $Sb_2O_3$, $Ba(OH)_2$, BeO and $Be(OH)_2$ on the surfaces of the nickel hydroxide powder, whereby even when the charging is conducted in an atmosphere at temperatures of 30° C. or higher, the oxygen evolving reaction is suppressed to facilitate the oxidation reaction of the nickel hydroxide to nickel oxyhydroxide.

Figure 3:
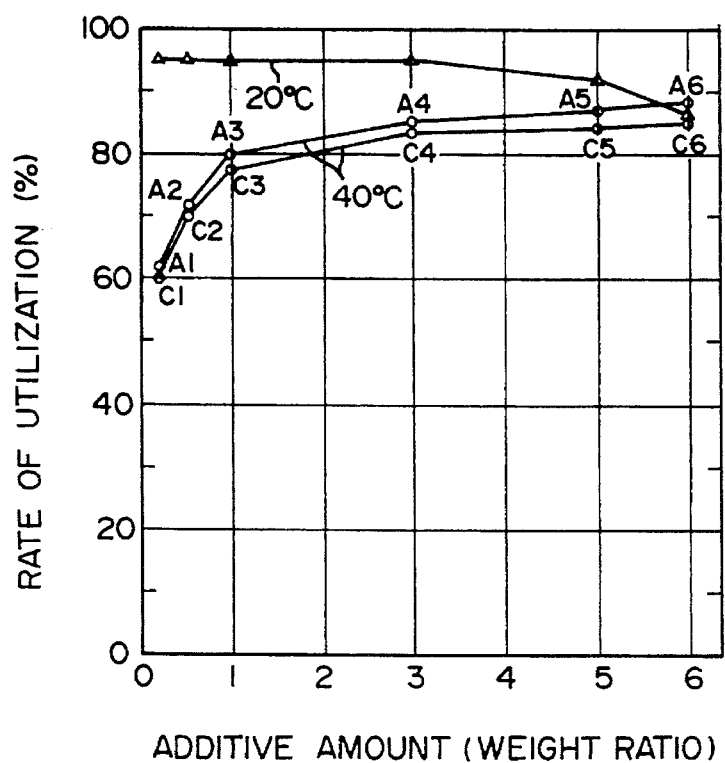
FIG. 3 is a graphical illustration showing the relationship between the amount of the additive to the nickel positive electrode produced according to the present invention and the rate of utilization.

Next, the positive electrodes, A1 to A6 and C1 to C6 were evaluated for the rate of utilization of the nickel hydroxide to yield the results as shown in FIG. 3. The addition amount by weight of 0.2 (A1, A2) resulted in a rate of utilization of about 60% at 40° C., i.e., the same level as in Comparative Examples shown in FIG. 2 indicating no effect attained by the addition. The effects of the addition of $Y_2O_3$ and $In_2O_3$ can be perceived in a ratio by weight from 0.5 or more allowing for attainment of an excellent rate of utilization no less than 70%. If the addition amount is in a ratio of 6, however, the rate of utilization at 20° C. is lowered to 86%, though the rate of utilization at 40° C. is not less than 85%. From the foregoing, the amount of $Y_2O_3$ and $In_2O_3$ to be added is preferably in a ratio by weight of 0.5 to 5.

Although description has been made only for the amount of $Y_2O_3$ and $In_2O_3$ to be added in this Example, the identical tendency has been exhibited by other additives. Moreover, although a foamed nickel having a nominal weight of 300 $g/m^2$ has been used for supports to retain the positive electrode active materials, those having a nominal weight ranging from 200 to 700 $g/cm^2$ are preferred from the point of view of energy density. Furthermore, the identical effects could be obtained by using other supports such as a porous fibrous nickel body, a sintered porous nickel body, punched metal, expanded metal, nets, or foils. Similarly, other cells or batteries such as Ni/Cd cells, nickel-zinc storage batteries, and the like than the nickel-hydrogen storage batteries can attain the same effects so long as they are of the cell type using the nickel positive electrode. The addition of powdery carbon and nickel to the positive electrode has an effect of improving discharge characteristics at the time of discharging at a great current.

EXAMPLE 2

Nickel positive electrodes used in this Example were produced as follows:

Nickel hydroxide, cobalt, cobalt hydroxide, a calcium compound such as one of calcium oxide, calcium hydroxide, calcium fluoride, calcium peroxide and calcium silicate, and an electroconducting agent such as one of powdery carbon and nickel were mixed in a proportion by weight of 100:7:5:3 to produce positive electrodes in the same procedure as in Example 1. The same nickel-hydrogen storage batteries as in Example 1 were made for evaluating the rate of utilization of the nickel hydroxide in the nickel positive electrodes. The test of the rate of utilization was conducted under the identical charge-discharge conditions to those in Example 1 in an ambient atmosphere at 20° C. and 40° C. Table 2 shows effects of various calcium compounds on the rate of utilization. In the Table 2, Comparative Example 1 indicates the result of the use of a positive electrode having a composition containing nickel hydroxide, cobalt and cobalt hydroxide in a weight ratio of 100:7:5 without any cadmium, and Comparative Example 2 indicates the result of that containing nickel hydroxide and calcium oxide in a weight ratio of 100:3 without any cadmium.

TABLE 2

Effects of additives on the rate of utilization

| Additives | Rate of utilization (%) | |
|---|---|---|
| | 20° C. | 40° C. |
| Comparative Example 1 | 95 | 58 |
| Comparative Example 2 | 83 | 62 |
| Calcium oxide | 93 | 85 |
| Calcium hydroxide | 92 | 81 |
| Calcium fluoride | 94 | 80 |
| Calcium peroxide | 93 | 78 |
| Calcium silicate | 92 | 82 |

Comparative Example 1 indicated a low rate of utilization of 58% at 40° C. for the nickel hydroxide in the positive electrode because of the inclusion of no cadmium. Comparative Example 2 where calcium oxide was added in a ratio by weight of 3 indicated a rate of utilization of the nickel hydroxide of 83% and 62%, at 20° C. and 40° C., respectively, suggesting that calcium oxide alone could not enhance the rate of utilization. In contrast, the use of the positive electrodes according to the present invention resulted in a rate of utilization of 92 to 94% at 20° C. and 78 to 85% at 40° C. Although the rate of utilization tends to decrease at 40° C., there is still obtained superior characteristics to those of Comparative Examples. This enhancement in the rate of utilization achieved with the paste type nickel positive electrodes comprising cobalt, cobalt hydroxide, a calcium compound and nickel hydroxide may be considered attributable to the occurrence of transformation of the cobalt and the calcium compound at the time of charging, especially at the initial charging and discharging, the synergetic effects of which enhances the rate of utilization.

Although description has been made for the amount of calcium added in a ratio by weight of 3 in this Example, the amount of calcium in the ratio ranging from 0.5 to 5 by weight gives rise to good results similarly to the case in Example 1. Moreover, although a foamed nickel having a nominal weight of 300 g/m$^2$ has been used for supports to retain the positive electrode active materials, those having a nominal weight ranging from 200 to 700 g/cm$^2$ are preferred from the point of view of energy density. Furthermore, the identical effects could be obtained even by using other supports such as a porous fibrous nickel body, a sintered porous nickel body, punched metal, expanded metal, nets, or foils. Similarly, other cells or batteries such as Ni/Cd cells, nickel-zinc storage batteries, and the like than the nickel-hydrogen storage batteries can attain the same effects so long as they are of such type as using the nickel positive electrode. In this Example, description has been made for the use of nickel hydroxide, cobalt and calcium compounds, though zinc oxide and zinc hydroxide may be further added to achieve an additional improvement in the rate of utilization under high temperature atmosphere.

EXAMPLE 3

Nickel-hydrogen storage batteries were manufactured in the same procedure as in Example 1 using constituents as shown in Table 3.

fabric, i.e., a sulfonated separator. These cells were evaluated for discharge capacity in ambient atmosphere at temperatures of 20°, 40° and 50° C. The discharge capacity was determined by charging the cells at a charge rate of 0.1 C for 15 hours in ambient atmosphere at a temperature of 20°, 40° and 50° C., and then left to stand for three hours in an atmosphere at 20° C., and thereafter, discharged at a discharge rate corresponding to 0.2 C in an atmosphere at 20° C. until reaching 1.0 V. The cycle life was determined by charging the cells at 1 C for 1.3 hours and then discharging at 1C until 1.0 V is reached, in ambient atmosphere at a temperature of 0°, 20°, 40° C., and repeating this charge and discharge cycle until a deterioration of 40% based on the initial discharge capacity is attained, which time was taken as the end of the working life. Cells Nos. 1, 2, 3, 4 and 5 were evaluated for cell capacity and cycle life, the results of which are given in Table 4.

TABLE 4

| | Discharge capacities and cycle lives of various cells | | | | | |
|---|---|---|---|---|---|---|
| Cell | Discharge capacity (mAh) | | | Cycle life / ∞ | | |
| No. | 20° C. | 40° C. | 50° C. | 0° C. | 20° C. | 40° C. |
| 1 | 970 | 580 | 350 | 150 | 250 | 250 |
| 2 | 970 | 610 | 350 | 350 | 450 | 453 |
| 3 | 950 | 850 | 780 | 250 | 370 | 360 |
| 4 | 950 | 865 | 775 | 460 | 530 | 510 |
| 5 | 950 | 860 | 770 | 460 | 539 | 515 |

In the Table 4, it can be seen that Cell No. 1 is inferior in the discharge capacity at 40° and 50° C. and in the cycle life in the temperature range of 0° to 40° C. because of con-

TABLE 3

| | Constituents of various cells | | | | | | | | |
|---|---|---|---|---|---|---|---|---|---|
| | Positive electrode composition | | | | | | Electrolyte | | Capacity ratio |
| Cell | (Weight ratio) | | | | | | | Amount | Negative electrode/ |
| No. | Ni(OH)$_2$ | Co | Co(OH)$_2$ | ZnO | Zn(OH)$_2$ | Ca(OH)$_2$ | S.G. | (cm$^3$/Ah) | Positive elctrode |
| 1 | 100 | 5 | 5 | | | | 1.3 | 2.0 | 1.5 |
| 2 | 100 | 5 | 5 | 3 | | | | | |
| 3 | 100 | 5 | 5 | | | 3 | | | |
| 4 | 100 | 5 | 5 | 3 | | 3 | | | |
| 5 | 100 | 5 | 5 | 2 | 1 | 3 | | | |
| 6 | 100 | 5 | 5 | 0.2 | | 3 | | | |
| 7 | 100 | 5 | 5 | 0.5 | | 3 | | | |
| 8 | 100 | 5 | 5 | 1 | | 3 | | | |
| 9 | 100 | 5 | 5 | 5 | | 3 | | | |
| 10 | 100 | 5 | 5 | 6 | | 3 | | | |
| 11 | 100 | 5 | 5 | 3 | | 0.2 | | | |
| 12 | 100 | 5 | 5 | 3 | | 0.5 | | | |
| 13 | 100 | 5 | 5 | 3 | | 1 | 1.3 | 2.0 | 1.5 |
| 14 | 100 | 5 | 5 | 3 | | 5 | | | |
| 15 | 100 | 5 | 5 | 3 | | 6 | | | |
| 16 | 100 | 7 | 5 | 2 | | 3 | 1.15 | 2.0 | 1.5 |
| 17 | | | | | | | 1.20 | | |
| 18 | | | | | | | 1.35 | | |
| 19 | | | | | | | 1.30 | 0.95 | 1.5 |
| 20 | | | | | | | | 1.0 | |
| 21 | | | | | | | | 2.5 | |
| 22 | | | | | | | | 3.0 | |
| 23 | | | | | | | 1.30 | 2.0 | 1.0 |
| 24 | | | | | | | | | 1.1 |

The cell capacity was controlled by the positive electrodes with the theoretical capacity being 1000 mAh. For a separator, there was used sulfonated polypropylene non-woven taining no zinc oxide nor calcium hydroxide in the positive electrode. Cell No. 2 containing zinc oxide in the positive electrode is considerably improved in the cycle life over Cell No. 1, though it is little improved in the discharge capacity at 40° C. and 50° C. Cell No. 3 containing calcium hydroxide is improved in the discharge capacity at 40° C. and 50° C. over Cells Nos. 1 and 2, though it is only a little improved in the cycle life over Cell No. 1. As above, Cells Nos. 1, 2 and 3 are lacking in an overall balance among cell characteristics even though they are constituted in an ideal state with respect to the specific gravity and the amount of the electrolyte and the ratio in capacity of the negative electrode to the positive one. In contrast, it can be seen that Cells Nos. 3 and 4 containing cobalt, cobalt hydroxide, zinc oxide, zinc hydroxide and calcium hydroxide in the positive electrode are excellent in the discharge capacity at 20° to 50° C. and the cycle life in the range of 0° to 40° C. The improvements in discharge capacity and cycle life may be attributed to the synergetic effect of cobalt, zinc and calcium.

Next, Cells Nos. 6, 7, 8, 9, 10 were evaluated for discharge capacity and cycle life in the same procedure as above, the results of which are given in Table 5.

TABLE 5

Discharge capacities and cycle lives of various cells

| Cell | Discharge capacity (mAh) | | | Cycle life / ∞ | | |
|---|---|---|---|---|---|---|
| No. | 20° C. | 40° C. | 50° C. | 0° C. | 20° C. | 40° C. |
| 6 | 970 | 845 | 780 | 150 | 250 | 250 |
| 7 | 970 | 843 | 782 | 350 | 450 | 453 |
| 8 | 950 | 850 | 780 | 390 | 450 | 453 |
| 9 | 915 | 865 | 775 | 460 | 530 | 510 |
| 10 | 850 | 860 | 772 | 470 | 530 | 500 |

It is evident from Table 5 that Cell No. 6 has poor cycle life owing to the amount of zinc oxide added being in a weight ratio of 0.2 and that Cell No. 10 has poor discharge capacity at 20° C. owing to the amount of zinc oxide added being in a weight ratio of 6. From these results, the optimum amount of zinc oxide to be added is in a weight ratio ranging 0.5 to 5.

TABLE 6

Discharge capacities and cycle lives of various cells

| Cell | Discharge capacity (mAh) | | | Cycle life / ∞ | | |
|---|---|---|---|---|---|---|
| No. | 20° C. | 40° C. | 50° C. | 0° C. | 20° C. | 40° C. |
| 11 | 970 | 610 | 400 | 450 | 440 | 450 |
| 12 | 970 | 715 | 600 | 450 | 450 | 453 |
| 13 | 950 | 790 | 700 | 460 | 450 | 453 |
| 14 | 915 | 900 | 780 | 460 | 530 | 510 |
| 15 | 850 | 890 | 772 | 370 | 430 | 460 |

It can be seen clearly from the results of Table 6 that Cell No. 11 containing calcium hydroxide added in a weight ratio of 0.2 has poor discharge capacity at 40° C. and 50° C. and that Cell No. 11 is inferior in the discharge capacity at 20° C. and in the cycle life at 0° C. due to the amount of calcium hydroxide added being in a weight ratio of 6. From the foregoing, the amount of calcium hydroxide to be added should be preferably in a weight ratio ranging from 0.5 to 5 as in Cells Nos. 12 to 14. This additive alone is difficult to act effectively, but it can improve the overall cell characteristics in the presence of cobalt, cobalt hydroxide, zinc oxide and calcium hydroxide.

Next, Cells Nos. 16 to 24 were evaluated for cell characteristics, the results of which are summarized in Table 7.

TABLE 7

Discharge capacities and cycle lives of various cells

| Cell | Discharge capacity (mAh) | | | Cycle life / ∞ | | |
|---|---|---|---|---|---|---|
| No. | 20° C. | 40° C. | 50° C. | 0° C. | 20° C. | 40° C. |
| 16 | 860 | 850 | 700 | 460 | 530 | 510 |
| 17 | 930 | 860 | 750 | 460 | 530 | 510 |
| 18 | 950 | 855 | 770 | 320 | 400 | 350 |
| 19 | 820 | 730 | 610 | 150 | 180 | 170 |
| 20 | 930 | 830 | 750 | 400 | 490 | 470 |
| 21 | 950 | 870 | 780 | 480 | 550 | 530 |
| 22 | 950 | 870 | 780 | 200 | 350 | 300 |
| 23 | 950 | 770 | 650 | 200 | 310 | 250 |
| 24 | 950 | 865 | 775 | 430 | 502 | 409 |

As shown in Table 7, Cell No. 16 has a reduced discharge capacity of 860 mAh at 20° C. due to the specific gravity of the electrolyte being 1.15. Cell No. 18 has a reduced cycle life due to the specific gravity of the electrolyte being 1.35. From the results of Cells Nos. 4 and 5 in Table 4 and Cell No. 17 in Table 7, the specific gravity of the electrolyte should be preferably in the range of 1.2 to 1.3. The following Cells Nos. 19 to 22 were evaluated for the effects of the amount of the electrolyte, from the results of which the amount of the electrolyte should be preferably in the range of 1.0 to 2.5 cm$^3$/Ah as shown in the results of Cells Nos. 20 and 21. Cell No. 19 containing less amount of the electrolyte is lowered both in the cycle life and the discharge capacity because of an insufficient reaction at electrodes. When the paste type nickel positive electrodes are used, the cobalt, zinc and calcium included in the positive electrodes react with the electrolyte so that the electrolyte has a lower specific gravity. In case less amount of the electrolyte is present, the discharge capacity and the cycle life are diminished. Cell No. 22 containing a larger amount of the electrolyte underwent a leakage of the electrolyte at the time of overcharging because an insufficient gas absorption raction occured in the cell resulting in reduction in cycle life. Next, the examination on the correlation between the ratio of the negative electrode capacity to the positive one and the cell characteristics indicated that a proportion of 1.0 diminished the cycle life and the discharge capacity at a temperature not lower than 40° C. as shown in Cell No. 23. This diminishing of the cycle life may be caused by the suppression of oxygen gas evolution at charging with the negative electrode being sufficiently charged due to the addition of cobalt, zinc and calcium to the positive electrode, so that the ratio of 1.0 causes insufficient gas absorbing ability in the negative electrode resulting in the leakage of the electrolyte. The diminishing of the discharge capacity at a temperature not lower than 40° C. may be attributed to a decrease in the charging efficiency of the negative electrode rather than the positive electrode so that the discharge capacity of the cell is restricted at the negative electrode. Therefore, the ratio of the negative electrode capacity to the positive one must be at least 1.1 or more as shown in Cell No. 24.

Although calcium hydroxide was used in this Example, the identical results can be obtained by using other calcium compounds such as calcium oxide, calcium sulfide, calcium peroxide and calcium silicate. Similar results can be also obtained by using an alkaline electrolyte comprising at least one of sodium hydroxide and potassium hydroxide, and lithium hydroxide so long as the specific gravity and the amount are appropriate. Although description has been made for the cylindrical sealed nickel-hydrogen storage battery in the present Examples, the identical effects can be attained for a square type or a large capacity type of nickel-hydrogen storage battery as used for electric automobiles.

As above, according to the present invention there is provided a paste type nickel positive electrode comprising a major component of nickel oxide and a bulk porous body, porous plate, or plate supporting the nickel oxide and imparting electroconductivity thereto, where the positive electrode contains at least one of compounds of yttrium, indium, antimony, barium, calcium and beryllium. In another aspect, the present invention provides a paste type nickel positive electrode comprising a major component of nickel oxide and a bulk porous body, porous plate, or plate supporting the nickel oxide and imparting electroconductivity thereto, where the positive electrode contains at least one of cobalt, cobalt hydroxide and cobalt oxide and at least one of calcium compounds incorporated therein. In still another aspect, the present invention provides a nickel-hydrogen storage battery comprising a nickel positive electrode composed of a major component of nickel oxide, a negative electrode consisting of a main body composed of an hydrogen storage alloy capable of electrochemically absorbing and desorbing hydrogen, an alkaline electrolyte, a separator, a case surrounding them, and sealing plate equipped with a relief valve, where the nickel positive electrode before initial charge is of a paste type and contains in the powdery form nickel hydroxide, at least one of cobalt, cobalt hydroxide and cobalt oxide, at least one of zinc oxide and zinc hydroxide and a calcium compound, said at least one of zinc oxide and zinc hydroxide being 0.5 to 5 parts by weight, said calcium compound being 0.5 to 5 parts by weight based on 100 parts by weight of the nickel hydroxide, and a bulk porous body or plate supporting said powdery components and imparting electroconductivity thereto, said alkaline electrolyte having a specific gravity of 1.2 to 1.3 (20° C.), the theoretical negative electrode capacity being not less than 1.1 times the theoretical positive electrode capacity, and the amount of electrolyte being 1.0 to 2.5 $cm^3$/Ah cell capacity. By employing a simple constitution as above, there can be povided a positive electrode for use in an alkaline storage batteries which is excellent in the rate of utilization of the nickel hydroxide in ambient atmosphere in a wide range of temperature. Moreover, there can be povided a nickel-hydrogen storage battery which has an excellent cell capacity in an atmosphere in a wide temperature range and an excellent cycle life.

What is claimed is:

1. A pasted nickel positive electrode for use in alkaline storage batteries comprising an active material containing a major component of nickel oxide, and a support selected from the group consisting of a bulk porous body, porous plate and a plate supporting said active material and imparting electroconductivity thereto, wherein said active material contains at least one compound selected from the group consisting of compounds of yttrium, indium and antimony.

2. The nickel positive electrode for use in alkaline storage batteries according to claim 1, wherein said compounds of yttrium, indium and antimony are $Y_2O_3$, $Y(OH)_3$, $In_2O_3$, $In_2O$, $In_2O_3 \cdot H_2O$, $Sb_2O_3$ and $Sb_2O_4$[, $Ba(OH)_2$, $Ca(OH)_2$, $CaO$, $BeO$ and $Be(OH)_2$].

3. The nickel positive electrode for use in alkaline storage batteries according to claim 1, wherein said compounds of yttrium, indium and antimony are included in an amount of 0.5 to 5 parts by weight based on 100 parts by weight of said nickel oxide.

4. The nickel positive electrode for use in alkaline storage batteries according to claim 1, wherein said active material contains at least one member selected from the group consisting of cobalt, cobalt hydroxide and cobalt oxide.

5. The nickel positive electrode for use in alkaline storage batteries according to claim 1, wherein said active material comprises at least one member selected from the group consisting of zinc oxide and zinc hydroxide.

6. The nickel positive electrode for use in alkaline storage batteries according to claim 1, wherein said bulk porous body is selected from the group consisting of foamed porous nickel body, fibrous porous nickel body, sintered porous nickel body, porous plate, perforated metal and expanded metal.

7. The nickel positive electrode for use in alkaline storage batteries according to claim 1, wherein said plate is a nickel or nickel plated iron foil.

8. The nickel positive electrode for use in alkaline storage batteries according to claim 6, wherein said foamed porous nickel body has a facial density of 200 to 700 $g/m^2$.

9. The nickel positive electrode for use in alkaline storage batteries according to claim 1, wherein said nickel oxide is spherical particles.

10. The nickel positive electrode for use in alkaline storage batteries according to claim 1, wherein said active material is pasted and contains at least one member selected from the group consisting of carbon and nickel.

11. A pasted nickel positive electrode for use in alkaline storage batteries comprising an active material containing a major component of nickel oxide, and a support selected form the group consisting of a bulk porous body, porous plate and a plate supporting said active material and imparting electroconductivity thereto, wherein said active material contains at least one member selected from the group consisting of cobalt, cobalt hydroxide and cobalt oxide and at least one calcium compound selected from the group consisting of calcium oxide, calcium fluoride, calcium sulfide, calcium peroxide and calcium silicate.

12. The nickel positive electrode for use in alkaline storage batteries according to claim 11, wherein said calcium compound is included in an amount of 0.5 to 5 parts by weight based on 100 parts by weight of said nickel oxide.

13. The nickel positive electrode for use in alkaline storage batteries according to claim 11, wherein said active material is pasted and contains at least one member selected from the group consisting of zinc oxide and zinc hydroxide.

14. The nickel positive electrode for use in alkaline storage batteries according to claim 11, wherein said bulk porous body is selected from the group consisting of foamed porous nickel body, fibrous porous nickel body, porous plate, perforated metal and expanded metal.

15. The nickel positive electrode for use in alkaline storage batteries according to claim 11, wherein said plate is a nickel or nickel plated iron foil.

16. The nickel positive electrode for use in alkaline storage batteries according to claim 14, wherein said foamed porous nickel body and said fibrous porous nickel body have a facial density of 200 to 700 $g/m^2$.

17. The nickel positive electrode for use in alkaline storage batteries according to claim 11, wherein said active material is pasted and contains at least one member selected from the group consisting of carbon and nickel.

18. A nickel-hydrogen storage battery which comprises a nickel positive electrode comprising an active material containing a major component of nickel oxide, a negative electrode consisting of a main body composed of an hydrogen storage alloy capable of electrochemically absorbing and desorbing hydrogen, an alkaline electrolyte, a separator, a case surrounding those cell components, and a sealing plate equipped with a relief valve, wherein:

said nickel positive electrode before initially charging comprises a paste comprising nickel hydroxide, at least one member of the group consisting of cobalt, cobalt hydroxide and cobalt oxide, at least one member of the group consisting of zinc oxide and zinc hydroxide and at least one calcium compound selected from the group consisting of calcium oxide, calcium fluoride, calcium sulfide, calcium peroxide and calcium silicate, said at least one member of the group of zinc oxide and zinc hydroxide being 0.5 to 5 parts by weight, said at least one calcium compound being 0.5 to 5 parts by weight based on 100 parts by weight of the nickel hydroxide;

a bulk porous body, porous plate, or plate supporting said paste and imparting electroconductivity thereto;

said alkaline electrolyte having a specific gravity of 1.2 to 1.3 at 20° C.;

the theoretical negative electrode capacity being not less than 1.1 times the theoretical positive electrode capacity; and the amount of electrolyte being 1.0 to 2.5 $cm^3$/Ah cell capacity.

19. The nickel-hydrogen storage battery according to claim 18, wherein said bulk porous body is selected from the group consisting of foamed porous nickel body, fibrous porous nickel body, porous plate, perforated metal and expanded metal.

20. The nickel-hydrogen storage battery according to claim 18, wherein said plate is a nickel or nickel plated iron foil.

21. The nickel-hydrogen storage battery according to claim 18, wherein said foamed porous nickel body and said fibrous porous nickel body have a facial density of 200 to 700 $g/m^2$.

22. The nickel-hydrogen storage battery according to claim 18, wherein said alkaline electrolyte comprises at least one member of the group consisting of potassium hydroxide and sodium hydroxide, and lithium hydroxide.

23. The nickel-hydrogen storage battery according to claim 18, wherein said separator is sulfonated.

24. The nickel-hydrogen storage battery according to claim 18, wherein said nickel positive electrode contains at least one member selected from the group consisting of carbon and nickel.

* * * * *